Patented July 31, 1945

2,380,448

UNITED STATES PATENT OFFICE 2,380,448

LIGNIN AND METHOD OF PRODUCTION

Raphael Katzen, Brooklyn, N. Y., assignor to Northwood Chemical Company, Phelps, Wis., a corporation of Wisconsin No Drawing. Application January 25, 1941,
Serial No. 375,927

7 Claims. (Cl. 260—124)

This invention relates to the recovery of new substantially pure lignins by means of dilute acid pressure hydrolysis of wood and extraction with oxygenated organic solvents.

Heretofore it has been known to the art that various lignins isolated from waste liquors of sulfite, soda, or kraft processes of paper manufacture are soluble to some extent in certain organic solvents. Some solvents such as ether, methanol-benzene and ethanol-benzene have been applied to pretreatment of wood particles prior to lignin analysis (Sherwood, Ritter, et al. I. & E. C., Analytical Ed. 4,202, 1932; I. & E. C., 24, 103, 1932). In this latter case, the solvent is used to remove oily and gummy materials which would interfere with the lignin analysis. A. J. Bailey (U. S. Patent 2,166,540) utilizes butanol in combination with dilute alkali to remove lignin from woody material, but has not been able to complete this separation to any extent with the solvent alone. See also U. S. Patents Nos. 2,037,001 and 2,190,909. The former involves the use of water-butanol mixtures at elevated temperatures and pressures, while the latter utilizes alcohols and hydrochloric acid to separate lignin from cellulose.

It is not feasible to recover various lignins from paper mill wastes by use of organic solvents, evidently because of the presence of inorganic complexes (ligno-sulfonic acid and sodium-lignin salts) and carbohydrate matter (hemicellulose and sugars) which apparently interfere with the separation of any relatively pure form of lignin. Application of organic solvents to the original wood fails to remove any appreciable amounts of pure lignin because of the fact that in its original state the lignin molecule is too complex (and probably too closely tied to the cellulose) to be solvent-soluble. The last case described above, e. g., the application of solvent plus alkali to woody material (obviously a combination of the first two methods), has been developed for the purpose of obtaining a relatively pure form of cellulose. Thus, hemicellulose, gums and oils must be removed along with the lignin, and remain with it as impurities.

In no case, prior to this invention, has it been practically possible to isolate considerably yields of a relatively pure form of lignin, substantially free of oils, gums and carbohydrate materials, with substantially little change in the structure and composition of the lignin due to the method of isolation.

However, I have found that dry hydrolyzed lignocellulose produced by hydrolysis processes, for example, those described in Olson et al. U. S. Patent 2,156,159 or in Sherrard et al. U. S. Patent 2,153,316, may be treated with organic solvents to separate soluble fractions of the particular lignins contained therein. My invention includes the discovery that solvents such as methanol, ethanol, n-propanol, iso-propanol, n-butanol, secondary-butanol, tertiary-butanol, iso-butanol, 2-ethyl hexanol, methyl cellosolve, namely, ethylene glycol monomethyl ether "cellosolve," namely, ethylene glycol mono-ethyl ethers "butyl cellosolve," namely ethylene glycol monobutyl ether diacetone alcohol, dioxane, methyl acetate, ethyl acetate, acetone and methanol-benzene, either individually or certain of them in combination, will dissolve some of the lignins present in the lignocelluloses which have been hydrolyzed; these soluble lignins being precipitated and recovered by evaporating part of the solvent from the extract, and then adding water or other non-solvent for the lignins, or pouring the concentrated extract into a large volume of water, or other non-solvent for the lignins; or alternatively, by complete evaporation of the solvent. So far as determined, all of the above neutral oxygenated organic solvents function to dissolve these lignins to a degree, and it is believed that all oxygenated organic solvents will so function without major chemical effect upon the lignin.

In order to define the terms of the invention, it is necessary to describe the use of the generic term "lignin." In general, lignin is the non-cellulosic (or non-carbohydrate) solid component of plant cells. The structure and properties of lignin vary according to the species of plant referred to; and may even vary within a given plant, as between the heartwood and sapwood of trees. Most importantly, chemical methods of isolation of lignin which involve chemical reactions affect its structure and properties, and give not lignin but lignin derivatives of substantially different chemical and physical properties. For instance, the chemical and physical properties of lignins obtained from a given species of wood by alkaline or acid pulping processes, chlorination, etc., will vary with the method of removal and recovery.

Referring to the hydrolyzed lignocellulose involved in this application, the original hydrolysis processes cause no major chemical changes in the lignin component. However, a very small part of the methoxyl content of the lignin is hydrolyzed and splits off as methanol. Moreover, and of major importance, some of the complex lignin molecules are evidently changed and are probably de-polymerized in varying degrees, so that some parts become more reactive and solvent soluble. As a result, certain lignin fractions may be isolated from the hydrolyzed lignocellulose by organic solvent extraction, which apparently involves little further chemical change, if any, in the composition of the lignin recovered.

It is noteworthy that the lignin thus isolated is substantially free of oily, gummy, and carbohydrate material. This is probably due to the fact that the hydrolysis process has to a great extent removed or dissolved the first two impurities, and converted the more reactive carbohydrates (hemicelluloses) to water-soluble sugars. The remaining cellulose in the hydrolyzed lignocellulose is sufficiently stable to resist organic solvent action.

Dependent upon the precise solvent utilized to extract the lignins, and also dependent upon the actual conditions of its recovery, definitely varying physical properties are observed.

However, the lignins recovered are usually in the form of a dry amorphous fluffy powders, with a color range from cream colored to dark brown, with a specific gravity of about 1.4, with melting points varying from about 85° to about 170° C., and with a methoxyl content varying between approximately 15% and approximately 25%.

The lignins are relatively water insoluble and may be utilized in a variety of ways, particularly as a binder for plastics, for the especial reason that the function of the lignins in the original plant was that of a binder.

Also due to the probable de-polymerization of the soluble lignin during hydrolysis, it is more reactive chemically than insoluble lignin, or lignin in the original plant material. Thus, it may be subjected to various condensation reactions to form thermosetting, thermoplastic, and oil-soluble resins. This reactive soluble lignin may also be subjected readily to oxidation, reduction, halogenation, alkylation, arylation, acylation, nitration, sulfonation, and other addition and substitution reactions.

As an example of the method of operation of this invention, the following procedure is described. Dry hydrolyzed lignocellulose is placed in a suitable extractor, for instance of the Sohxlet type, and extracted with a solvent at its boiling point until no more lignin dissolves in the solvent. The solvent extract is then evaporated to a small volume and poured into a large volume of cold water. The solvent soluble lignin precipitates from solution, is filtered, washed with water, and dried at moderate temperatures.

In all instances where the terms "soluble lignin" or "solvent soluble lignin" have been utilized, it should be understood as meaning a lignin relatively soluble, literally in a neutral, oxygenated, organic solvent.

To be more concrete and to set forth certain specific examples:

*Example 1.*—1000 grams of lignocellulose containing approximately 46% total lignin and approximately 54% carbohydrate matter is placed in a Sohxlet type extractor. Approximately 5 liters of "cellosolve" is placed in the still of the extractor and boiled, the vapors being passed to condensers arranged in such a manner that condensate at its boiling point is passed through the lignocellulose. The soluble lignin is dissolved in the cellosolve, and the extract is syphoned from the extraction chamber intermittently and returned to the still. After 16 hours, the solvent leaving the extraction chamber is colorless, and no further substantial quantities of lignin can be dissolved.

The extract in the still is removed to an evaporator and concentrated by boiling to a volume of approximately 1 liter. The concentrated extract is then poured into about 3 liters of water at approximately 20° C. to precipitate the extracted soluble lignin. This lignin is filtered, washed with water, and dried at approximately 50° C. Approximately 200 grams of soluble lignin are obtained, of substantially brown color, and with a melting point of approximately 170° C.

*Example 2.*—The same steps are followed as those set forth in Example 1, except that in the precipitation step, approximately 3 liters of water are poured into approximately 1 liter of the concentrated lignin extract, causing a precipitation of the lignin.

*Example 3.*—The same steps are followed as those set forth in Example 1, except that approximately 5 liters of methanol are utilized instead of cellosolve, and except that the lignin in the concentrated extract is precipitated by being poured into about 3 liters of ethyl ether to precipitate the same. This lignin is filtered, washed with ether and dried at 50° C. Approximately 150 grams of soluble lignin are obtained, having a substantially tan color, and with a melting point of about 130° C.

*Example 4.*—1000 grams of lignocellulose containing approximately 65% total lignin and approximately 35% carbohydrate matter are placed in a Sohxlet type extractor. Approximately 5 liters of methanol is placed in the still of the extractor and boiled, the vapors being passed to condensers arranged in such a manner that condensate at its boiling point is passed through the lignocellulose. The soluble lignin is dissolved in the methanol, and the extract is syphoned from the extraction chamber intermittently and returned to the still. After 16 hours, the solvent leaving the extraction chamber is colorless, and no further substantial quantities of lignin can be dissolved.

The extract in the still is removed to an evaporator and concentrated by boiling to a volume of approximately 2 liters. The concentrated extract is then poured into about 10 liters of water at approximately 20° C. to precipitate the extracted soluble lignin. This lignin is filtered, washed with water, and dried at approximately 50° C. Approximately 300 grams of soluble lignin are obtained, of substantially tan color, and with a melting point of approximately 85° C.

*Example 5.*—1000 grams of lignocellulose containing approximately 55% total lignin and approximately 45% carbohydrate matter are extracted by steps in batch fashion; at first with 3 liters of boiling methanol, the extract removed (part being physically retained by the lignocellulose), and the soluble lignin precipitated by pouring the extract into approximately 3 to 5 times its own volume of water. The precipitated lignin is then washed with water and dried—it is light tan in color, melts at approximately 140° C., and the yield is approximately 70 grams.

Next, the partially extracted lignocellulose from the previous step is re-extracted with fresh boiling methanol equal in volume to the volume of solvent extract previously removed, and the soluble lignin recovered as above. The approximately 40 grams yield has a tan color, and melts at approximately 150° C.

Next a third extraction by same method yields approximately 20 grams of soluble lignin, brown in color, melting at approximately 155° C.

Finally a fourth extraction of the same method yields approximately 12 grams of soluble lignin, dark brown in color, melting at approximately 160° C.

It is noted in this progressive extraction, that the color darkens and the melting points go up in the successive stages.

*Example 6.*—1000 grams of lignocellulose containing approximately 46% total lignin and approximately 54% carbohydrate matter is placed in a Sohxlet type extractor. Approximately 5 liters of acetone are placed in the still of the extractor and boiled, the vapors being passed to condensers arranged in such a manner that condensate at its boiling point is passed through the lignocellulose. The lignin is dissolved in the acetone and the extract is syphoned from the extraction chamber intermittently and returned to the still. After 12 hours the solvent leaving the extraction chamber is colorless and apparently no further substantial quantities of lignin can be dissolved.

The extract in the still is removed to an evaporator and heated (preferably under vacuum) until all the solvent is removed. The lignin residue is run into pans where it solidifies on cooling. A yield of approximately 150 grams of black, vitreous, lignin is obtained, melting at approximately 150° C.

In order to identify the fractions isolated, two methods of analysis are used. It is known that lignin contains from about 12 to about 25% methoxyl groups, depending on its source and method of isolation; while hemicelluloses contain only about 1–2% methoxyl, and cellulose contains practically no methoxyl. By the method of E. P. Clark (J. A. O. A. C. 41, 3468, P. 25) this value is readily determined, and serves as a direct measure of the purity of the lignin isolated. For further identification, the analysis used to determine the amount of residual solvent-insoluble lignin in lignocellulose may be applied also to the recovered soluble lignin. In this case, the 72% sulfuric acid method of G. J. Ritter et al. (I. & E. C., Analytical Ed. 4,202, 1932) is supplied as described, except that the preliminary alcohol-benzene extraction (usually used to remove oily and gummy impurities from wood) is omitted.

Applying these methods to a series of lignins isolated from a maple lignocellulose containing about 46.2% total lignin, the results in Table I are obtained.

*Table I*

| Solvent | Percent soluble lignin based on— | | Soluble lignin | |
|---|---|---|---|---|
| | Lignocellulose | Total lignin | Percent methoxyl | Percent lignin by 72% $H_2SO_4$ |
| "Cellosolve" | 20.4 | 44.1 | 19.9 | 81.4 |
| Dioxane | 19.0 | 41.1 | 19.4 | 78.5 |
| Methanol-benzene | 17.8 | 38.5 | 18.7 | 83.5 |
| Methanol | 16.2 | 35.1 | 19.5 | 83.5 |
| Acetone | 15.7 | 33.9 | 18.7 | 84.5 |
| Diacetone alcohol | 13.0 | 28.1 | | 88.2 |
| Butanol | 12.3 | 26.6 | 18.8 | 82.2 |

Thus it is shown that soluble lignins isolated by use of various organic solvents according to my invention are approximately similar chemically and are relatively pure forms of lignin.

In my invention above described, it will be understood that the term "lignin" is understood in the claims and in the specifications to include a group of polymers of similar chemical nature but having definitely varying physical properties, the examples set forth are given merely for the purposes of disclosure and in order to cover the ranges of melting points, pressure or temperatures mentioned; however it will be clearly understood by those skilled in the art that the production techniques involved may be modified in part to obtain substantially some of the results with generally similar products, and it will also be understood that various additions and substitutions may be made to effect generally similar results. The particular solvents listed are in no way indicated as being inclusive but are listed for purposes of illustration: it is within the purview of this invention to include various equivalent solvents and those which give substantially the same results as those that have been mentioned hereinabove. The appended claims therefore should be looked upon as including the various equivalents referred to above.

I claim:

1. A method of isolating from hydrolyzed lignocellulose produced by pressure acid hydrolysis of plant fibres high yields of substantially pure lignins having melting ranges within the interval of temperature between about 85° and about 170° C. which comprises the steps of treating the hydrolyzed lignocellulose with at least one solvent selected from the group consisting of methanol, ethanol, n-propanol, iso-propanol, n-butanol, secondary butanol, tertiary butanol, iso-butanol, 2-ethyl hexanol, ethylene glycol monomethyl ether, ethylene glycol monoethyl ether, ethylene glycol monobutyl ether, diacetone alcohol, dioxane, methyl acetate, ethyl acetate, acetone and methanol-benzene, separating the extract from the residual solid, mixing said extract with an excess of water and separating and drying the lignins.

2. A method of isolating from hydrolyzed lignocellulose produced by pressure acid hydrolysis of plant fibers high yields of substantially pure lignins having melting ranges within the interval of temperature between about 85° C. and about 170° C. which comprises the steps of treating the hydrolyzed lignocellulose with at least one solvent selected from the group consisting of methanol, ethanol, n-propanol, iso-propanol, n-butanol, secondary butanol, tertiary butanol, iso-butanol, 2-ethyl hexanol, ethylene glycol monomethyl ether, ethylene glycol monoethyl ether, ethylene glycol monobutyl ether, diacetone alcohol, dioxane, methyl acetate, ethyl acetate, and acetone, and separating the extract from the residual solid.

3. A method of isolating from hydrolyzed lignocellulose produced by pressure acid hydrolysis of plant fibers high yields of substantially pure lignins having melting ranges within the interval of temperature between about 85° C. and about 170° C. which comprises the steps of treating the hydrolyzed lignocellulose with at least one solvent selected from the group consisting of methanol, ethanol, n-propanol, iso-propanol, n-butanol, secondary butanol, tertiary butanol, iso-butanol, 2-ethyl hexanol, ethylene glycol monomethyl ether, ethylene glycol monoethyl ether, ethylene glycol monobutyl ether, diacetone alcohol, dioxane, methyl acetate, ethyl acetate, and acetone, and separating the extract from the residual solid recovering the lignins from said extract.

4. A method of isolating from hydrolyzed lignocellulose produced by pressure acid hydrolysis of plant fibers high yields of substantially pure lignins having melting ranges within the interval of temperature between about 85° C. and about 170° C. which comprises the steps of treating the hydrolyzed lignocellulose with at least one solvent selected from the group consisting of methanol, ethanol, n-propanol, iso-propanol, n-butanol, secondary butanol, tertiary butanol, iso-butanol, 2-ethyl hexanol, ethylene glycol monomethyl ether, ethylene glycol monoethyl ether, ethylene glycol monobutyl ether, diacetone alcohol, dioxane, methyl acetate, ethyl acetate, and acetone by bringing the temperature of said solvent to the boiling point, condensing the vapors and contacting the condensate at its boiling point to said lignocellulose, continuing the treatment until the solvent over-flow is substantially colorless, removing the extract and evaporating until a substantially concentrated extract is obtained, and contacting said concentrated extract with water.

5. A method of isolating from hydrolyzed lignocellulose produced by pressure acid hydrolysis of plant fibers high yields of substantially pure lignins having melting ranges within the interval of temperature between about 85° C. and about 170° C. which comprises the steps of treating the hydrolyzed lignocellulose with at least one solvent selected from the group consisting of methanol, ethanol, n-propanol, iso-propanol, n-butanol, secondary butanol, tertiary butanol, iso-butanol, 2-ethyl hexanol, ethylene glycol monomethyl ether, ethylene glycol monoethyl ether, ethylene glycol monobutyl ether, diacetone alcohol, dioxane, methyl acetate, ethyl acetate, and acetone, bringing the temperature of said solvent to the boiling point, condensing the vapors and returning the condensate at its boiling point to said lignocellulose, continuing the treatment until the solvent over-flow is substantially colorless, removing the extract and evaporating until a substantially concentrated extract is obtained, and recovering the lignins by contacting said concentrated extract with an excess of water.

6. A method of isolating from hydrolyzed lignocellulose produced by pressure acid hydrolysis of plant fibers high yields of substantially pure lignins having melting ranges within the interval of temperature between about 85° C. and about 170° C. which comprises the steps of treating said lignocellulose with methanol, separating the liquid from the solid phase, contacting said liquid with about three times its volume of water, and separating the liquid and solid phases.

7. A method of isolating from hydrolyzed lignocellulose produced by pressure acid hydrolysis of plant fibers high yields of substantially pure lignins having melting points within the range of the temperature between about 85° C. and 170° C., which comprises the steps of treating the hydrolyzed lignocellulose with methanol and separating the extract from the residual solid.

RAPHAEL KATZEN.